(12) United States Patent
Manganaro

(10) Patent No.: US 9,889,747 B2
(45) Date of Patent: Feb. 13, 2018

(54) DRIVE SYSTEM FOR A MOTOR VEHICLE

(71) Applicant: Jonathan Muntz, Scottsdale, AZ (US)

(72) Inventor: Carl Manganaro, Mesa, AZ (US)

( * ) Notice: Subject to any disclaimer, the term of this patent is extended or adjusted under 35 U.S.C. 154(b) by 0 days.

(21) Appl. No.: 15/247,046

(22) Filed: Aug. 25, 2016

(65) Prior Publication Data

US 2016/0362007 A1 Dec. 15, 2016

Related U.S. Application Data

(60) Division of application No. 14/527,541, filed on Oct. 29, 2014, now Pat. No. 9,457,671, which is a
(Continued)

(51) Int. Cl.
| | |
|---|---|
| *B60L 1/00* | (2006.01) |
| *B60L 3/00* | (2006.01) |
| *B60L 11/16* | (2006.01) |
| *B60L 11/12* | (2006.01) |
| *B60K 7/00* | (2006.01) |
| *H02K 7/02* | (2006.01) |

(Continued)

(52) U.S. Cl.
CPC ............... *B60L 11/16* (2013.01); *B60K 1/04* (2013.01); *B60K 6/30* (2013.01); *B60K 6/50* (2013.01); *B60K 7/0007* (2013.01); *B60L 1/006* (2013.01); *B60L 11/12* (2013.01); *B60L 11/18* (2013.01); *B60L 11/1851* (2013.01); *H02K 7/025* (2013.01); *B60K 2001/045* (2013.01); *B60K 2007/0038* (2013.01); *B60K 2007/0092* (2013.01); *B60Y 2200/91* (2013.01); *B60Y 2200/92* (2013.01); *B60Y 2400/162* (2013.01); *B60Y 2400/60* (2013.01); *Y02E 60/16* (2013.01); *Y02T 10/6204* (2013.01); *Y02T 10/641* (2013.01); *Y02T 10/7005* (2013.01); *Y02T 10/7027* (2013.01); *Y02T 10/7033* (2013.01); *Y10S 903/915* (2013.01)

(58) Field of Classification Search
CPC ... B60K 1/40; B60K 6/30; B60K 6/50; B60K 7/0007; B60K 2001/045; B60K 2007/0038; B60K 2007/0092; B60L 1/006; B60L 11/12; B60L 11/16; B60L 11/18; B60L 11/1851; H02K 7/025; B60Y 2200/91; B60Y 2200/92; B60Y 2400/162; B60Y 2400/60; Y02E 60/16
USPC ........................................................ 307/10.1
See application file for complete search history.

(56) References Cited

U.S. PATENT DOCUMENTS

| | | |
|---|---|---|
| 3,379,008 A | 4/1968 | Manganaro |
| 3,496,799 A | 2/1970 | Call |

(Continued)

*Primary Examiner* — Rexford Barnie
*Assistant Examiner* — Toan Vu
(74) *Attorney, Agent, or Firm* — Schmeiser, Olsen & Watts LLP

(57) ABSTRACT

A motor vehicle drive system utilizing a flywheel for storing recaptured kinetic energy from a moving vehicle is described. Alternators mounted to the drive train generate electrical power from the passively spinning wheels of a moving vehicle. This power may be used to rotate a flywheel. Energy from the continuously spinning flywheel is used or stored for later use to charge batteries which provide power to the drive wheels of the vehicle. The disclosed drive system can be mounted in an all-electric or gasoline-electric hybrid motor vehicle and provides additional power to an electric drive motor of the vehicle.

1 Claim, 10 Drawing Sheets

Related U.S. Application Data continuation-in-part of application No. 12/800,429, filed on May 14, 2010, now Pat. No. 8,967,305.

(51) Int. Cl.
  *B60K 1/04* (2006.01)
  *B60K 6/30* (2007.10)
  *B60K 6/50* (2007.10)
  *B60L 11/18* (2006.01)

(56) References Cited

U.S. PATENT DOCUMENTS

| | | |
|---|---|---|
| 3,665,788 A | 5/1972 | Nyman |
| 3,672,244 A | 6/1972 | Nasvytis |
| 3,790,816 A | 2/1974 | Berman |
| 3,870,116 A | 3/1975 | Seliber |
| 4,028,962 A | 6/1977 | Nelson |
| 4,282,948 A | 8/1981 | Jerome |
| 4,408,500 A | 10/1983 | Kulkarni et al. |
| 4,423,794 A | 1/1984 | Beck |
| 4,458,156 A | 7/1984 | Maucher et al. |
| 4,532,769 A | 8/1985 | Vestermark |
| 5,224,563 A | 7/1993 | Iizuka et al. |
| 5,244,054 A | 9/1993 | Parry |
| 5,465,806 A | 11/1995 | Higasa et al. |
| 5,568,023 A | 10/1996 | Grayer et al. |
| 5,637,939 A | 6/1997 | Serdar, Jr. et al. |
| 5,760,506 A | 6/1998 | Ahlstrom et al. |
| 5,798,593 A | 8/1998 | Salter, II et al. |
| 5,810,106 A | 9/1998 | McCoy |
| 5,828,137 A | 10/1998 | Sellars et al. |
| 5,925,993 A | 7/1999 | Lansberry |
| 6,082,476 A | 7/2000 | Stulbach |
| 6,122,993 A | 9/2000 | Morris et al. |
| 6,295,487 B1 | 9/2001 | Ono et al. |
| 6,758,295 B2 | 7/2004 | Fleming |
| 6,962,223 B2 | 11/2005 | Berbari |
| 7,255,185 B2 | 8/2007 | Shimizu |
| 7,416,039 B1 | 8/2008 | Anderson et al. |
| 7,552,787 B1 | 6/2009 | Williams |
| 7,624,830 B1 | 12/2009 | Williams |
| 7,654,355 B1 | 2/2010 | Williams |
| 7,854,278 B2 | 12/2010 | Kaufman |
| 7,958,960 B2 | 6/2011 | Mizutani et al. |
| 8,255,104 B2 | 8/2012 | Terayama |
| 8,950,528 B2 | 2/2015 | Ozaki |
| 8,967,305 B2 | 3/2015 | Manganaro |
| 9,027,682 B2 | 5/2015 | Lambert |
| 9,358,865 B1 | 6/2016 | Sherry |
| 2006/0137927 A1 | 6/2006 | Fleming |
| 2007/0163828 A1* | 7/2007 | Manganaro ............ B60L 11/16 180/165 |
| 2010/0304920 A1* | 12/2010 | Simon ................ B60W 20/00 477/3 |
| 2011/0278080 A1 | 11/2011 | Manganaro |
| 2011/0316377 A1* | 12/2011 | Warmenhoven ....... H02K 53/00 310/113 |
| 2013/0035817 A1 | 2/2013 | Bahar et al. |
| 2014/0324265 A1 | 10/2014 | Ozaki |
| 2014/0336856 A1 | 11/2014 | Loos et al. |
| 2015/0060172 A1 | 3/2015 | Manganaro |

\* cited by examiner

DRIVE SYSTEM FOR A MOTOR VEHICLE

CROSS REFERENCE TO RELATED APPLICATION

This application is a divisional of U.S. Nonprovisional patent application Ser. No. 14/527,541, filed Oct. 29, 2014. Application Ser. No. 14/527,541 is a continuation-in-part of U.S. Nonprovisional Patent Application to Carl Manganaro entitled "DRIVE SYSTEM FOR A MOTOR VEHICLE," Ser. No. 12/800,429, filed May 14, 2010, which issued on Mar. 3, 2015 as U.S. Pat. No. 8,967,305, the disclosures of which are hereby incorporated entirely herein by reference.

BACKGROUND OF THE INVENTION

Technical Field

The present invention relates generally to motor vehicle drive systems; specifically, to electrically or internal combustion engine-powered vehicles that utilize regenerative powering of electrical drive motors.

State of the Art

Electrically powered drive systems are among the oldest drive systems for vehicles. Electric vehicles first came into existence in the nineteenth century, when electricity was a preferred method for automobile propulsion. Drivers of early electric motor-powered automobiles did not experience the vibration, smell, and noise associated with then-available internal combustion engines. Additionally, early electric vehicles did not require a transmission or starting by a hand-crank. These and other advantages of electric vehicles provided a level of comfort and ease of operation that could not be achieved by the gasoline-powered cars of the day.

Historically, however, electric vehicles also had disadvantages when compared to alternatives. Their range was relatively short and infrastructure required for recharging was limited. Between 1890 and 1920, gasoline became much more widely available and considerably cheaper than electricity. Advances in technology, such as invention of the assembly line and the electric starter motor, made internal combustion engine-powered vehicles cheaper to purchase and fuel, and ultimately easier to operate and maintain, than electric vehicles. By the late 1920s, the internal combustion engine had largely replaced electric motors for vehicle drive systems.

Over recent decades, and particularly since the millennium, electrically powered vehicle drive systems have been making a comeback. Advances in battery technology along with the negative environmental and social impacts associated with burning of fossil fuels is creating new opportunities for alternative vehicle power sources and drive mechanisms. Although present systems for powering electric vehicles, whether purely electric or gasoline-electric hybrids, have advanced considerably, they continue to have deficiencies, particularly with range and acceleration. Electric motor power sources often fail to provide sufficient power to satisfy many consumers. Kinetic energy of the moving vehicle is either completely wasted or inefficiently utilized, further limited range and acceleration.

Accordingly, an improved drive system for electrically powered vehicles is needed.

DISCLOSURE OF THE INVENTION

The present invention relates generally to motor vehicle drive systems; specifically, to electrically or internal combustion engine-powered vehicles that utilize regenerative powering of electrical drive motors.

Disclosed is a drive system for a vehicle comprising a first alternator mechanically coupled to a wheel of the vehicle; a flywheel drive motor electrically coupled to the first alternator, wherein the first alternator powers the flywheel drive motor; a flywheel mechanically coupled to the flywheel drive motor, wherein the flywheel drive motor rotates the flywheel; and a second alternator mechanically coupled to the flywheel. In some embodiments, the drive system further comprises a first battery electrically coupled to the first alternator and the flywheel drive motor, wherein the first alternator charges the first battery and the first battery powers the flywheel drive motor. In some embodiments, the drive system further comprises a second battery electrically coupled to the second alternator, wherein the second alternator charges the second battery.

In other embodiments, the drive system further comprises an electronic control module electrically coupled to the first alternator, the first battery, the flywheel drive motor, the second alternator, and the second battery. In still other embodiments, the drive system further comprises an external A/C plug electrically coupled to the electronic control module.

In some embodiments, the flywheel is mounted within an engine compartment and wherein the flywheel's axis of rotation is less than fifteen degrees from vertical.

Some embodiments of the invention further comprise an all-electric vehicle mechanically coupled to the drive system. In other embodiments, the invention further comprises a gasoline-electric hybrid vehicle mechanically coupled to the drive system. In some embodiments, the wheel is a first wheel and the drive system further comprises a vehicle drive motor, wherein the second alternator powers the vehicle drive motor.

Disclosed is a vehicle drive system comprising a flywheel mechanically coupled to an alternator, wherein rotation of the flywheel causes the alternator to generate electricity. Some embodiments further comprise a battery electrically coupled to the alternator.

Also disclosed is a method of forming a drive system for a vehicle, comprising the steps of mechanically coupling a first alternator to a first wheel of the vehicle, wherein rotation of the first wheel of the vehicle causes the first alternator to generate electricity; electrically coupling the first alternator to a flywheel drive motor, wherein the first alternator powers the flywheel drive motor; coupling the flywheel drive motor to a flywheel, wherein rotation of the flywheel drive motor causes the flywheel to rotate; coupling the flywheel to a second alternator, wherein rotation of the flywheel causes the second alternator to generate electricity; and electrically coupling the second alternator to a vehicle drive motor, wherein electricity generated by the second alternator powers the vehicle drive motor.

In some embodiments, the method further comprises electrically coupling the first alternator to a first battery. In some embodiments, the method comprises electrically coupling the first battery to the flywheel drive motor, wherein the first battery powers the flywheel drive motor. In some embodiments, the method further comprises coupling the vehicle drive motor to a second wheel of the vehicle, wherein the vehicle drive motor causes the vehicle second wheel to rotate, propelling the vehicle. In some embodiments, the method further comprises electrically coupling a second battery to the second alternator. In some embodiments, the method further comprises electrically coupling the second battery to the vehicle drive motor. In some embodiments, the method further comprises reversibly electrically coupling an external A/C power source to the flywheel drive motor, wherein the external A/C power source powers the flywheel drive motor when coupled. In still other embodiments, the method further comprises the flywheel electrically coupled to the vehicle drive motor.

The foregoing and other features and advantages of the present invention will be apparent to those of ordinary skill in the art from the following more particular description of the invention and its embodiments, and as illustrated in the accompanying drawing figures.

DETAILED DESCRIPTION OF EMBODIMENTS OF THE INVENTION

Figure 1:
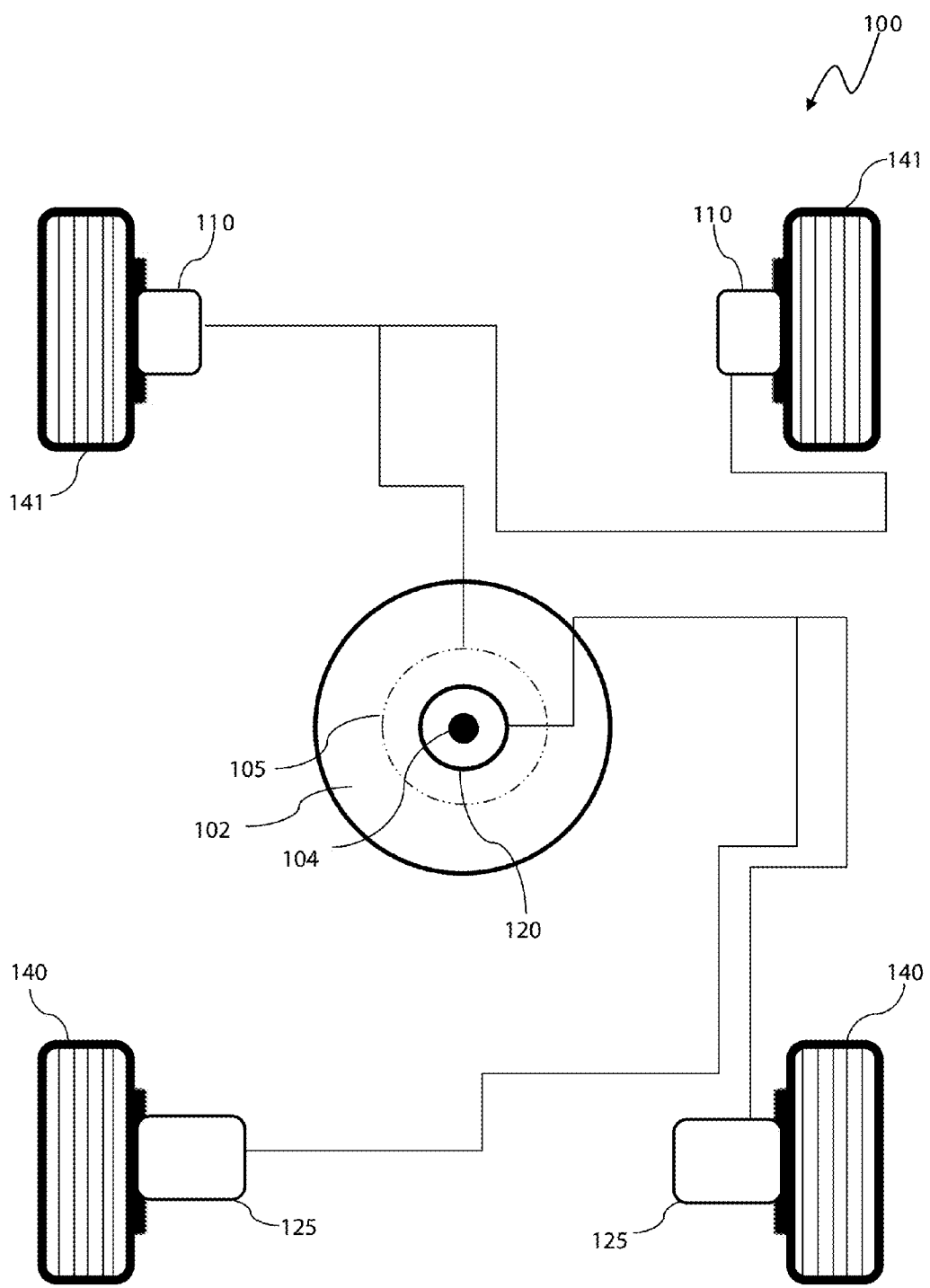
FIG. 1 is a schematic diagram showing relationships between components of a vehicle drive system.

As discussed above, this disclosure relates to motor vehicle drive systems; specifically, to electrically or internal combustion engine-powered vehicles that utilize regenerative powering of electrical drive motors.

Electrically powered vehicles, whether all-electric or gasoline-electric hybrids, power the vehicle's drive wheels with electric motors. Alternative or direct current is used, depending on the application. Electric motors require an energy storage system to provide continuous power to the motors. One solution has been to use one or more electrochemical batteries to store electrical energy and provide continuous power to the motors. An alternative energy storage system which uses kinetic energy stored in a rotating flywheel is also possible.

The disclosed drive system captures and stores a moving vehicle's kinetic energy within a spinning flywheel, in combination with conventional electrochemical batteries. The rotating flywheel becomes a continuous charging source for batteries powering the vehicle's drive motor(s). A goal of the system is to maximize conservation of the considerable kinetic energy possessed by a moving motor vehicle, and to exploit that energy as a substantial adjunct power source. This system works can be adapted to, and works equally well with, all-electric or gasoline-electric "hybrid" vehicles. The vehicle drive system is functionally divided into three primary component groupings: 1) energy capture; 2) energy storage; and 3) drive power.

The energy capture component grouping consists of an alternator mechanically coupled to a wheel of the vehicle. One two, or more alternators may each be mechanically coupled to a vehicle wheel, one alternator per wheel. The alternator charges a battery which provides power to a flywheel drive motor. The flywheel drive motor rotates a flywheel, thereby transferring the kinetic energy of the moving vehicle to the flywheel through an intermediate system of electrical power generation. Although this intermediate system of electrical alternators and flywheel motor may be less efficient at energy transfer than a direct mechanical linkage from the wheels to the flywheel, electrical power transfer has advantages over mechanical power transfer; namely, electrical energy is more easily and precisely monitored and controlled. When a flywheel is rotating at optimal speed, excess incoming electrical energy can be routed directly to a storage battery whereas excess mechanical energy cannot.

Storage of the captured kinetic energy is accomplished by a highly-efficient flywheel. A flywheel is a kinetic energy "battery," and has many advantages over a conventional electro-chemical battery. In contrast to an electrochemical battery, a flywheel has an almost unlimited lifespan and requires essentially no maintenance. A flywheel is not constrained to a limited number of charging cycles over its lifespan. An electrochemical battery, however, has a useful life limited to only three to five years. Finally, a flywheel may take only a few minutes to reach its maximum rotational speed "charge," while a large chemical battery may take hours.

Efficiency is optimized by mounting the flywheel on low-friction bearings, choosing a cross-sectional flywheel shape to maximize conservation of momentum and minimize drag, and containing the flywheel within a vacuum-sealed housing. The shaft of the spinning flywheel is connected to a flywheel alternator which delivers charge to additional batteries when the vehicle is in operation, and for a considerable time after the vehicle is stopped. Additionally, there are advantages to using a flywheel which are unrelated to energy storage. Centrally mounting a symmetrical, balanced horizontally rotating object of substantial mass underneath the chassis of a vehicle may improve vehicle stability and handling by lowering the overall center of gravity and generating a "gyroscope effect" from the rotating object's angular momentum.

Additional recaptured energy may be stored in conventional electrochemical batteries. When the vehicle is moving, there will be many conditions when the flywheel is rotating at an optimum speed; i.e. no additional recaptured energy storage capacity is available in the flywheel, yet energy is still being recaptured. Under these conditions, energy recaptured by alternator(s) coupled to the vehicle's wheels may be stored in such batteries.

Finally, drive power is available from batteries charged by the spinning flywheel or from a second alternator mechanically coupled to the flywheel. The batteries energize one or more electric motors that power the vehicle's drive wheels. All-electric or gasoline-electric hybrid vehicles have an electric motor mechanically coupled to drive wheels. In the disclosed vehicle drive system, batteries charged by the rotating flywheel provide energy recaptured from the moving vehicle to one or more of these motors. Under conditions wherein an electric drive-wheel motor is being powered with recaptured energy, the vehicle's primary "fuel" source, whether gasoline or electricity, is conserved, thus increasing the vehicle's range and operating efficiency. Because the recaptured energy is supplied to the vehicle's power train in the form of electricity, any electric motor otherwise employed by the vehicle's manufacturer may be powered by this system. Thus, the disclosed vehicle drive system is designed and intended to be versatile and adaptable for installation in all-electric or gasoline-electric hybrid vehicles from virtually any manufacturer.

FIG. 1 shows a simplified block diagram of a drive system 100. Drive system 100 is designed to be installed within a motor vehicle. In some embodiments, vehicle drive system 100 is installed as a supplemental power source for the vehicle's existing electric drive motor(s). In some embodiments, the motor vehicle is an all-electric vehicle. In other embodiments, the motor vehicle is a gasoline-electric hybrid vehicle. Drive system 100 includes an electric vehicle drive motor 125. Vehicle drive motor 125 converts electrical energy into rotation of a drive wheel 140. Rotation of drive wheel 140 propels the vehicle. FIG. 1 shows an embodiment with two vehicle drive motors 125.

Vehicle drive system 100 includes an alternator 110, coupled to a vehicle front wheel 141. Rotation of a front wheel 141 when the vehicle is in motion causes the corresponding alternator 110 to generate electricity. Examples of the mechanical coupling include utilizing a single reduction gear, multiple reduction gears, a chain-and-gear or belt-and-pulley system, or other similar mechanical couplings known and used in the art. In the embodiment shown in FIG. 1, each alternator 110 is mounted near the hub of a front wheel 141. Two alternators 110 are shown in this embodiment, one coupled to each front wheel 141. Because many versions of the aforementioned coupling mechanism are possible, according to the embodiment of the invention, specific coupling mechanisms are not shown by the drawing figures. Other embodiments may use a single alternator 110 coupled to a single front wheel 141. In this embodiment, the front wheels 141 are not drive wheels; front wheels 141 merely rotate passively when the vehicle is moving. Rotation of the front wheel(s) 141 is transferred to the shaft of alternator(s) 110 through the reduction gear or other mechanical coupling, generating an A/C current. The rotating alternator(s) 110 thereby converts mechanical kinetic energy from the moving vehicle into electrical energy by producing an alternating current.

As further shown by FIG. 1, the alternating current produced by alternator(s) 110 is used to power a flywheel drive motor 105. In some embodiments, the electrical connection between flywheel drive motor 105 and alternator 110 is through a power control device such as a voltage converter, a voltage controller, or other electrical device capable of controlling and converting current as is known in the art. Flywheel drive motor 105 rotates a flywheel 102. In various embodiments, the specific characteristics of flywheel drive motor 105, such as amperage, operating voltage, power, and torque for example, are chosen based upon the weight, diameter, maximum rotational speed, optimal rotational speed, and other mechanical characteristics of flywheel 102. Accordingly, flywheel drive motor 105 is chosen in specific embodiments to optimize the efficiency of energy conversion between alternator 110 and flywheel 102 using established techniques know to those skilled in the art.

Figure 2:
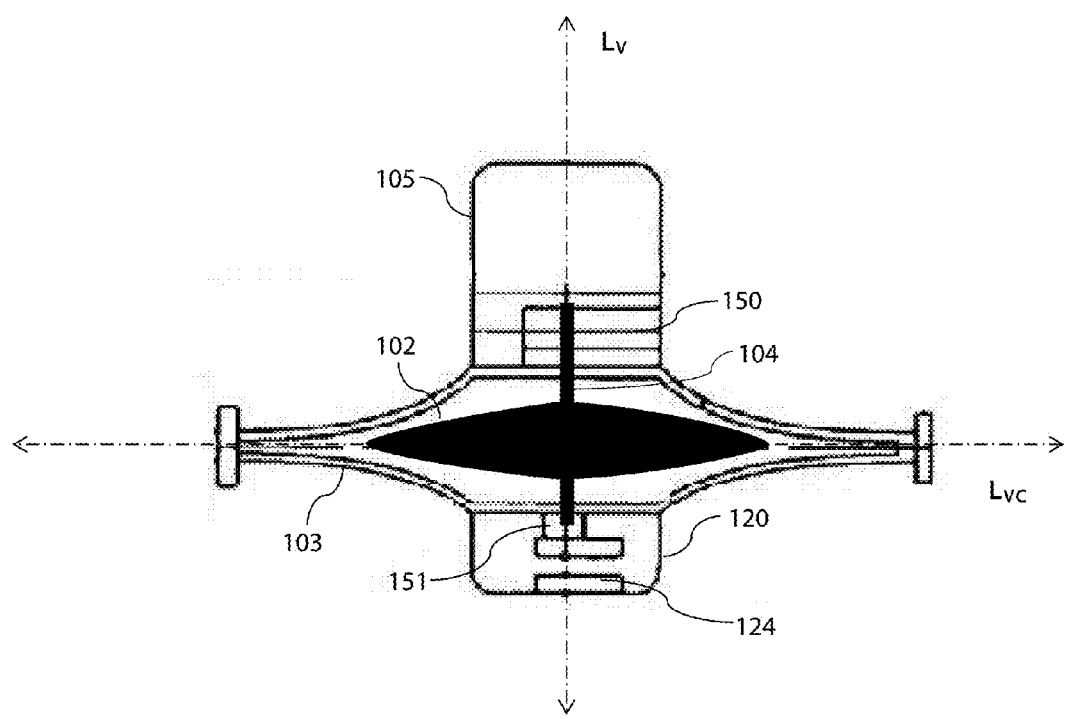
FIG. 2 is a side view depicting an embodiment of a flywheel housing-drive motor-alternator assembly.

FIG. 2 shows a side view of an example embodiment of flywheel 102, flywheel drive motor 105, and a second alternator 120 assembled together in a vertically "stacked" configuration. Rotating flywheel 102 is a source of stored energy recaptured from the moving vehicle, specifically from the rotation of wheels 141. Flywheel 102 is encased within a flywheel housing 103. A flywheel shaft 104 passes through the center of rotation of flywheel 102 and emerges from opposing sides of flywheel housing 103. In some embodiments, flywheel shaft 104 and flywheel 102 are a unitary body. One end of flywheel shaft 104 is mechanically coupled to flywheel drive motor 105 and the opposite end of flywheel shaft 104 is mechanically coupled to second alternator 120. The relative positions of flywheel drive motor 105 and second alternator 120 are shown in FIG. 2, without the internal components of these devices. In some embodiments of the invention, flywheel shaft 104 is coupled to flywheel 102 and rotates at the same speed as flywheel 102. Because different embodiments of the invention allow for flywheel 102, second alternator 120 and flywheel drive motor 105 to operate at differing rotational speeds, reduction differentials are used to match the rotational speeds of each of these three components. In the embodiment shown, a first differential 150 is mechanically coupled between one end of flywheel shaft 104 and flywheel drive motor 105, and a second differential 151 is mechanically coupled between the opposite end of flywheel shaft 104 and second alternator 120. The gear ratios of first differential 150 and second differential 151 are determined by the operating characteristics of each component—flywheel 102, drive motor 105, and alternator 120—of this three-component system. In some embodiments of the invention, a clutch 124 is interposed between second differential 151 and second alternator 120. In some embodiments, flywheel 102 is mechanically coupled to clutch 124, shown in FIG. 2. Thus, when clutch 124 is engaged, kinetic energy of rotating flywheel 102 is transformed to electrical energy by second alternator 120. Second alternator 120 is electrically coupled to, and provides power to, vehicle drive motors 125. Electrical power received by vehicle drive motors 125 are used to mechanically rotate drive wheels 140. Therefore, rotation of flywheel 102 causes rotation of drive wheels 140.

In some embodiments, the electrical connection between vehicle drive motors 125 and second alternator 120 is through a power control device such as a voltage converter, a voltage controller, or other electrical device capable of controlling and converting current as is known in the art. Alternatively, power from second alternator 120 may also be used to charge a second battery 122 (see FIG. 4) in states where drive motor(s) 125 have no need for additional power.

The location for mounting flywheel 102 and its associated components shown in FIG. 2 within a motor vehicle is chosen by a vehicle engineer according to the design characteristics of the particular vehicle model. In some embodiments, flywheel 102's mounting location is within the engine compartment. In some other embodiments, flywheel 102's mounting is located centrally beneath the vehicle along the vehicle's long-axis centerline. In still other embodiments, flywheel 102's mounting location is near the rear of the vehicle. As previously mentioned, it is desirable to locate flywheel 102 as low as possible and in a generally horizontal configuration. For example, with flywheel shaft 104 no greater than 15 degrees off a vertical center line Lv and along a vehicle long-axis centerline Lvc to maximize the vehicle's handling characteristics.

In some embodiments of the invention, flywheel housing 103 is a sealed enclosure containing flywheel 102 within a vacuum. The vacuum can be established during manufacture of flywheel 103 and flywheel housing 103 as an integrated assembly. Alternatively, the vacuum may be created and maintained during the vehicle's operation by providing a vacuum fitting on housing 103, coupling housing 103 to a standard electrical vacuum pump or directly to a vacuum system line from the vehicle. By operating flywheel 102 in a vacuum environment, energy lost from rotating flywheel 102 to friction is reduced.

Figure 3:
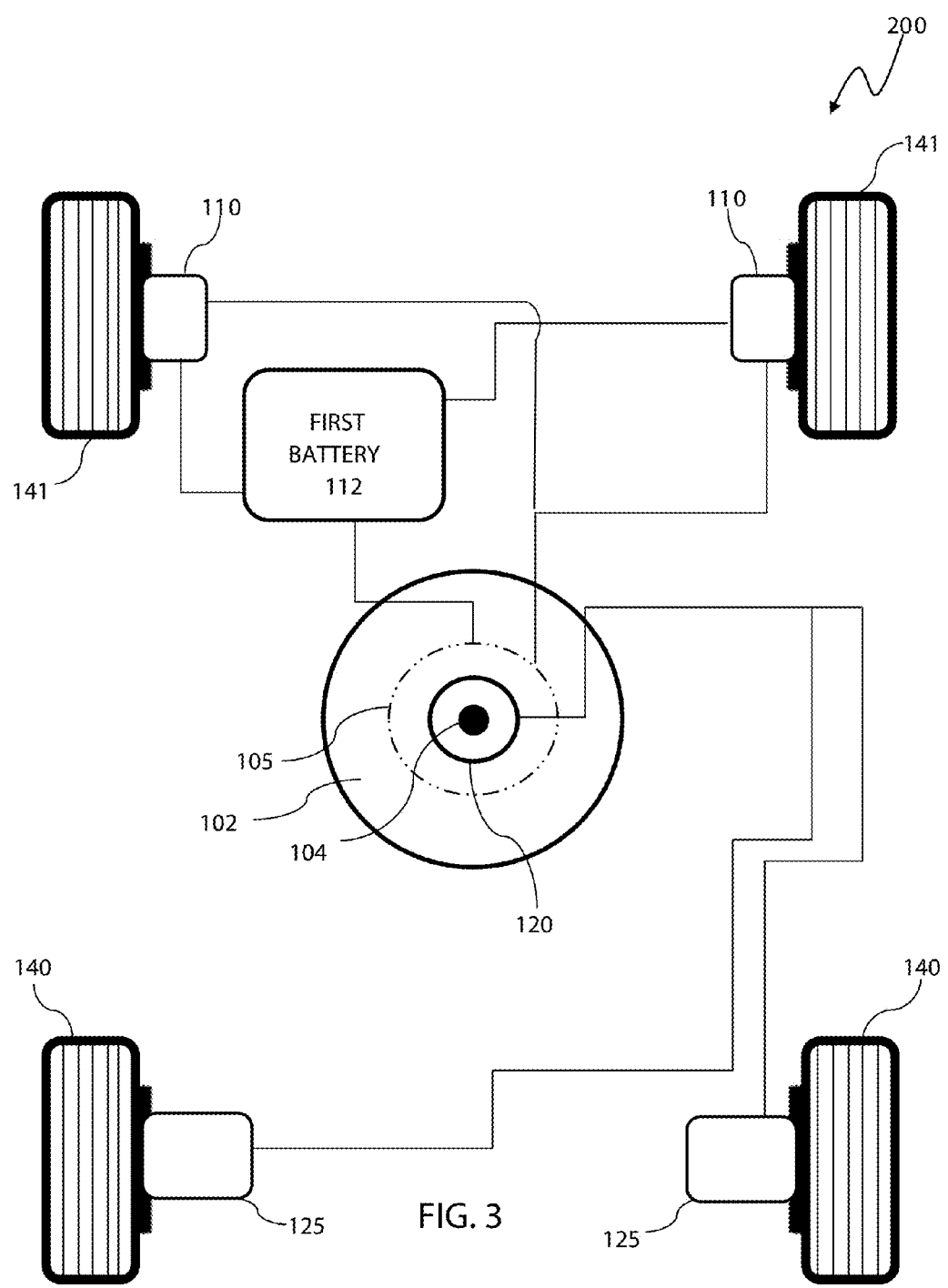
FIG. 3 is a schematic diagram showing relationships between the components of a vehicle drive system.

FIG. 3 shows a simplified schematic diagram of drive system 200. Drive system 200 is similar to drive system 100 of FIG. 1, with the addition of a first battery 112. First battery 112 is an additional source of stored energy recaptured from the moving vehicle by alternator(s) 110. In this embodiment, alternator(s) 110 provide a charging current to first battery 112. Alternators 110 in this embodiment provide electrical current to both first battery 112 and flywheel motor 105. In some embodiments, the electrical connection between first battery 112 and alternator 110 is through a power control device such as a voltage converter, a voltage controller, or other electrical device capable of controlling and converting current as is known in the art. In some embodiments, the electrical connection between first battery 112 and flywheel drive motor 105 is through a power control device such as a voltage converter, a voltage controller, or other electrical device capable of controlling and converting current as is known in the art.

Figure 4:
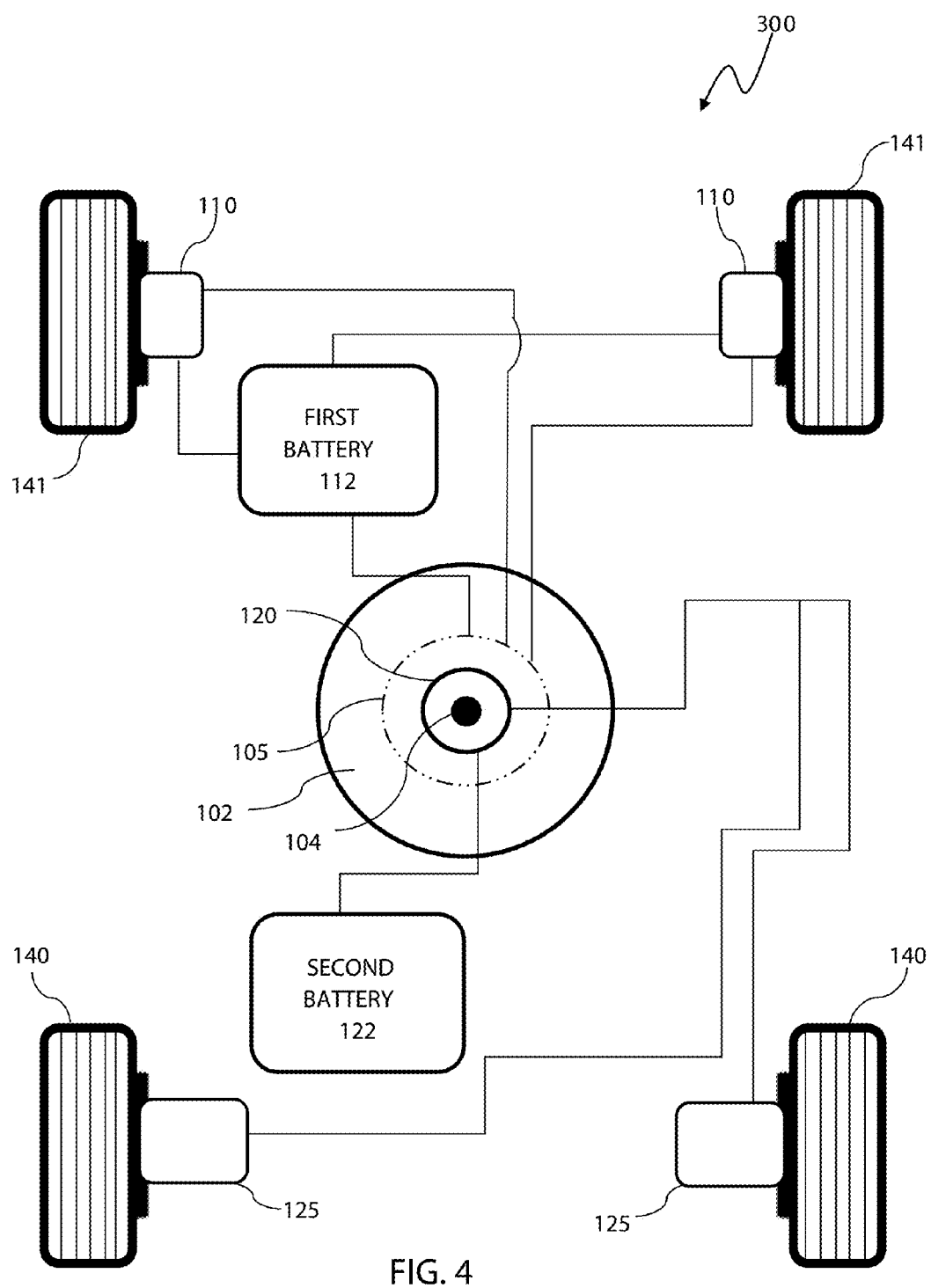
FIG. 4 is a schematic diagram showing relationships between the components of a vehicle drive system.

FIG. 4 shows a simplified schematic diagram of drive system 300. Drive system 300 is similar to drive system 200 of FIG. 3, with the addition of second battery 122. Second battery 122 is yet another source of stored energy recaptured from the moving vehicle by first alternator(s) 110. In as the embodiment shown by FIG. 4, second battery 122 is charged by second alternator 120. In some embodiments, second battery 122 is charged directly by first alternator 110. In some embodiments, the electrical connection between second battery 122 and second alternator 120 is through a power control device such as a voltage converter, a voltage controller, or other electrical device capable of controlling and converting current as is known in the art. Depending upon various parameters, such as the instant power needs of the vehicle, rotation speed of flywheel 102, and charge state of second battery 122 for example, current generated by second alternator 120 is used to energize drive motor(s) 125 or charge second battery 122. In some embodiments, ECM 131 (not shown in FIG. 4; shown in FIG. 8) distributes current generated by second alternator 120 in the aforementioned manner.

Figure 5:
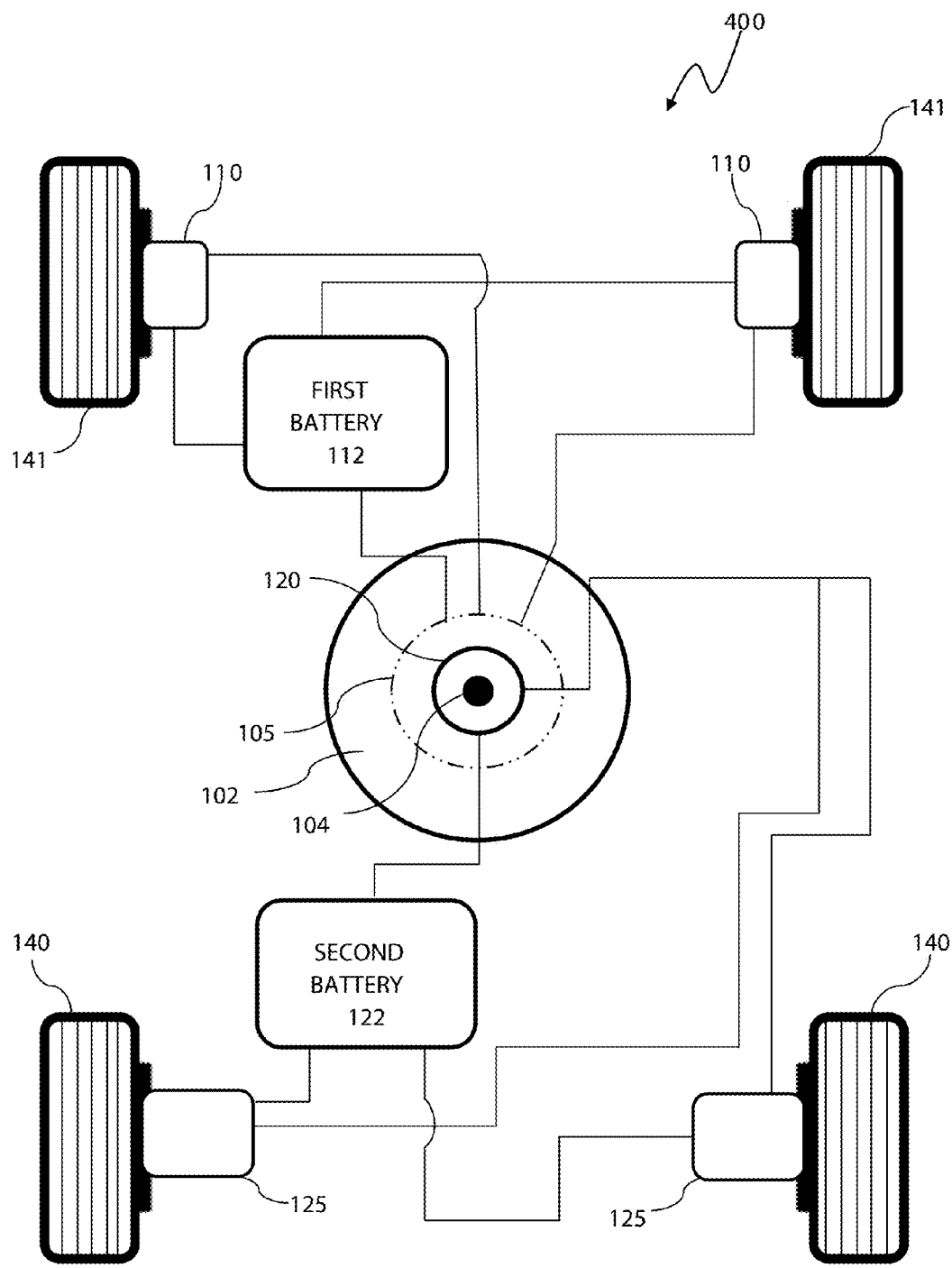
FIG. 5 is a schematic diagram showing relationships between the components of a vehicle drive system.

FIG. 5 shows a simplified schematic diagram of drive system 400. Drive system 400 is similar to drive system 300 of FIG. 4, with the addition of an electrical connection between second battery 122 and both vehicle drive motors 125. In this embodiment, current from second battery 122 is used to directly energize vehicle drive motor(s) 125. In some embodiments, the electrical connection between second battery 122 and vehicle drive motors 125 is through a power control device such as a voltage converter, a voltage controller, or other electrical device capable of controlling and converting current as is known in the art.

Figure 6:
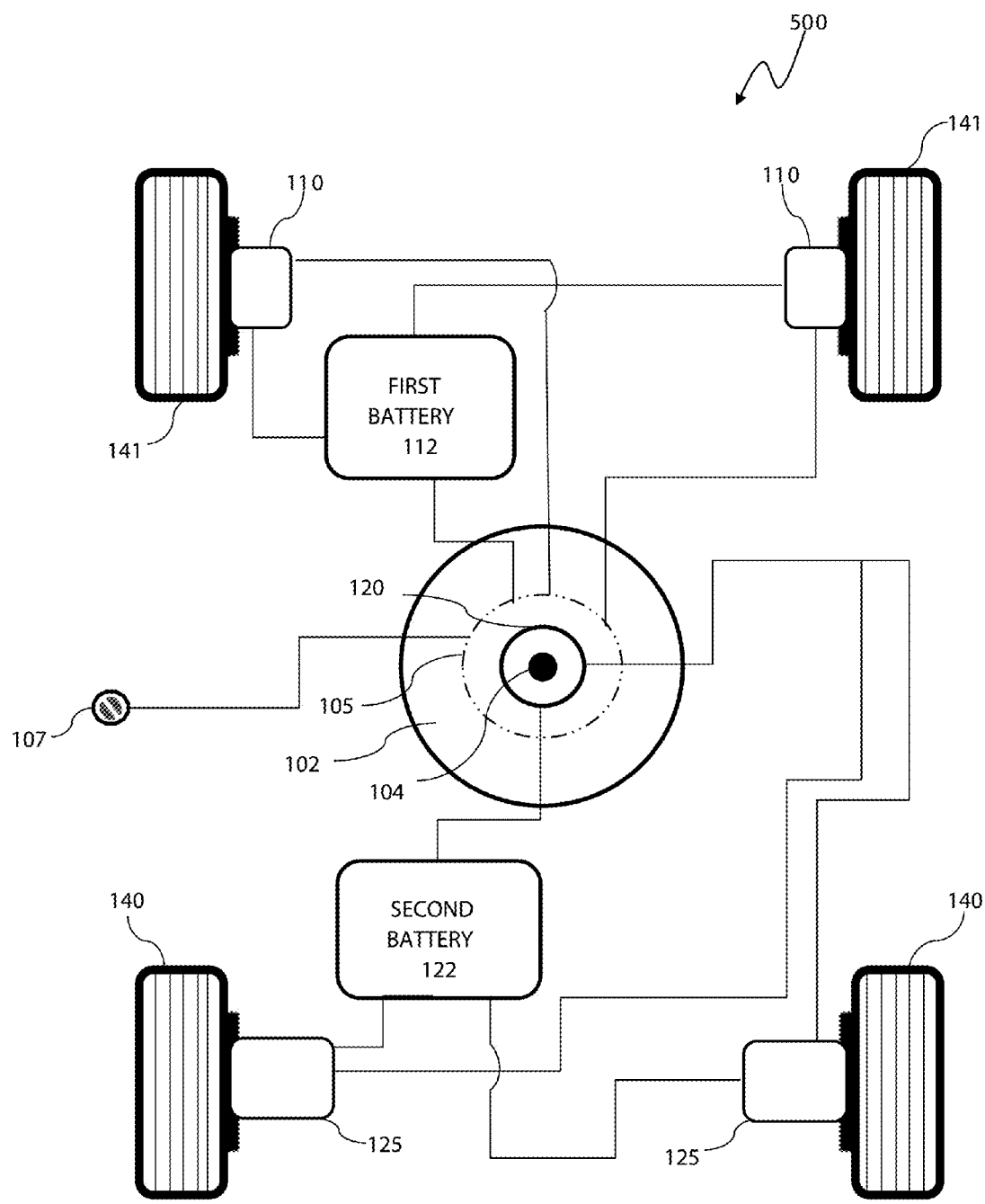
FIG. 6 is a schematic diagram showing relationships between the components of a vehicle drive system.

FIG. 6 shows a simplified schematic diagram of drive system 500. Drive system 500 is similar to drive system 400 of FIG. 5, with the additional of an external alternating current ("A/C") plug 107. This embodiment of the invention utilizes an external power source drawn through A/C plug 107 that is reversibly coupled (plugged in) to an external source of A/C electricity to drive system 600, such as a standard residential electrical outlet for example. A/C power from plug 107 is used to power flywheel drive motor 105, thereby spinning-up flywheel 102 to its operating speed prior to driving the vehicle, if desired. In some embodiments not shown in FIG. 6, externally delivered A/C power is additionally used to fully charge first battery 112 and second battery 122 when the vehicle is parked overnight or for any adequate period of time where there is an external source of A/C power available, such as in the garage of the vehicle owner's home.

Figure 7:
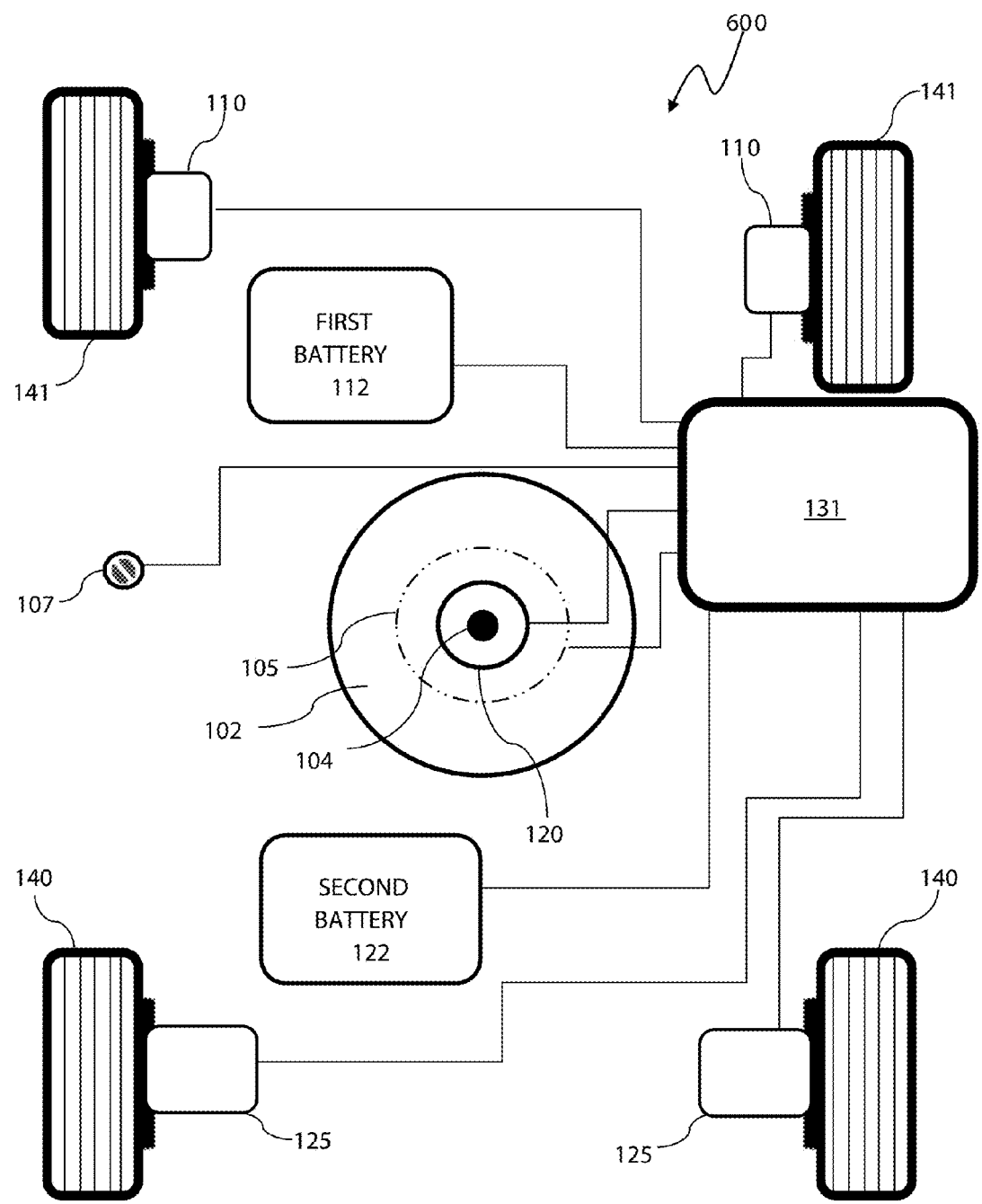
FIG. 7 is a schematic diagram showing relationships between the components of a vehicle drive system.

FIG. 7 shows drive system 600, including an electronic control module ("ECM") 131. In this embodiment, ECM 131 regulates the distribution and utilization of energy throughout system 600 by monitoring the operational state of the vehicle and components of drive system 600. At a minimum, ECM 131 monitors current produced by alternator(s) 110, the rotational speed of flywheel 102, the charge state of first battery 112, and the charge state of second battery 122. Because the alternating currents generated and utilized throughout drive system 600 are stored within direct current storage batteries 112 and 122, ECM 131 rectifies and inverts current inputs and outputs depending upon the source and destination of the current. In some embodiments of the invention, ECM 131 is a single, multifunction vehicle control "computer." In other embodiments of the invention, ECM 131 may represent a plurality of control modules dedicated to isolated portions of the drive system.

ECM 131 regulates the distribution of voltages and currents throughout the entire drive system 600 to optimize energy capture, energy storage, and power utilization for a spectrum of vehicle power states and driving conditions. ECM 131 performs conversions from alternating current to direct current when needed. For example, under some conditions, first battery 112 will be incompletely charged and ECM 131 will route alternating current from alternator(s) 110 to more completely charge first battery 112. Under other conditions where first battery 112 is more completely charged, ECM 131 will route alternating current from alternator(s) 110 directly to flywheel drive motor 105. Distribution of the recaptured energy is, therefore, balanced between two storage modalities—electrical (first battery 112) and kinetic (rotating flywheel 102). The optimal balance between these two alternative energy storage modalities to achieve optimal efficiency is governed by ECM 131. The two modalities are both cumulative and complimentary; meaning, energy is converted between electrical and kinetic states and shared between first battery 112 and flywheel 102, maximizing both energy storage capacity and efficiency.

In some embodiments, ECM 131 performs additional functions. For example, power from an external source entering drive system 600 from plug 107 is distributed by ECM 131 according to the charge status of first battery 112, second battery 122, and the rotation speed of flywheel 102. ECM 131 thereby distributes external A/C power accordingly between the two batteries and flywheel drive motor 105. In some embodiments, ECM 131 is electrically coupled to clutch 124. In such embodiments, clutch 124 is a magnetic clutch actuated by ECM 131 under conditions where second alternator 124 is charging second battery 122 or energizing drive motor(s) 125. When additional power is not needed, ECM 131 disengages clutch 124 so as not to unnecessarily drain stored kinetic energy from rotating flywheel 102.

Referring back to FIG. 1, FIG. 3, FIG. 4, FIG. 5, FIG. 6, and FIG. 7, and as described in the embodiments above, rotating flywheel 102 is coupled to second alternator 120, thereby rotating a shaft of second alternator 120. Rotating a shaft of second alternator 120 causes second alternator 120 to generate A/C current. Second alternator 120 is electrically coupled to second battery 122. In some embodiments, the electrical coupling of second alternator 120 and second battery 122 is through ECM 131. The current generated from rotating second alternator 120 is stored in second battery 122 or energizes vehicle drive motor(s) 125. A rear wheel 140 (shown by FIG. 1, FIG. 3, FIG. 4, FIG. 5, FIG. 6, and FIG.

7) is a drive-wheel for the vehicle. Embodiments of the invention may utilize one or both rear wheels 140 as drive wheels. Rear wheel 140 is mechanically coupled to a vehicle drive motor 125 through a reduction gear, belt-and-pulley, or other system of mechanical coupling similar to that between first alternator(s) 110 and front wheel(s) 141. In embodiments of drive system 100, 200, 300, 400, 500, or 600 installed in any all-electric or gasoline-electric hybrid vehicle, vehicle drive motor(s) 125 are powered by the vehicle's primary storage batteries, second alternator 120, or second battery 122, depending on the relative charge states of the vehicle's primary storage batteries and second battery 122. ECM 131 charges second battery 122 using current from second alternator 120. Second battery 120 provides power to vehicle drive motor(s) 125, alone or in concert with the primary drive system of the vehicle.

Figure 8:
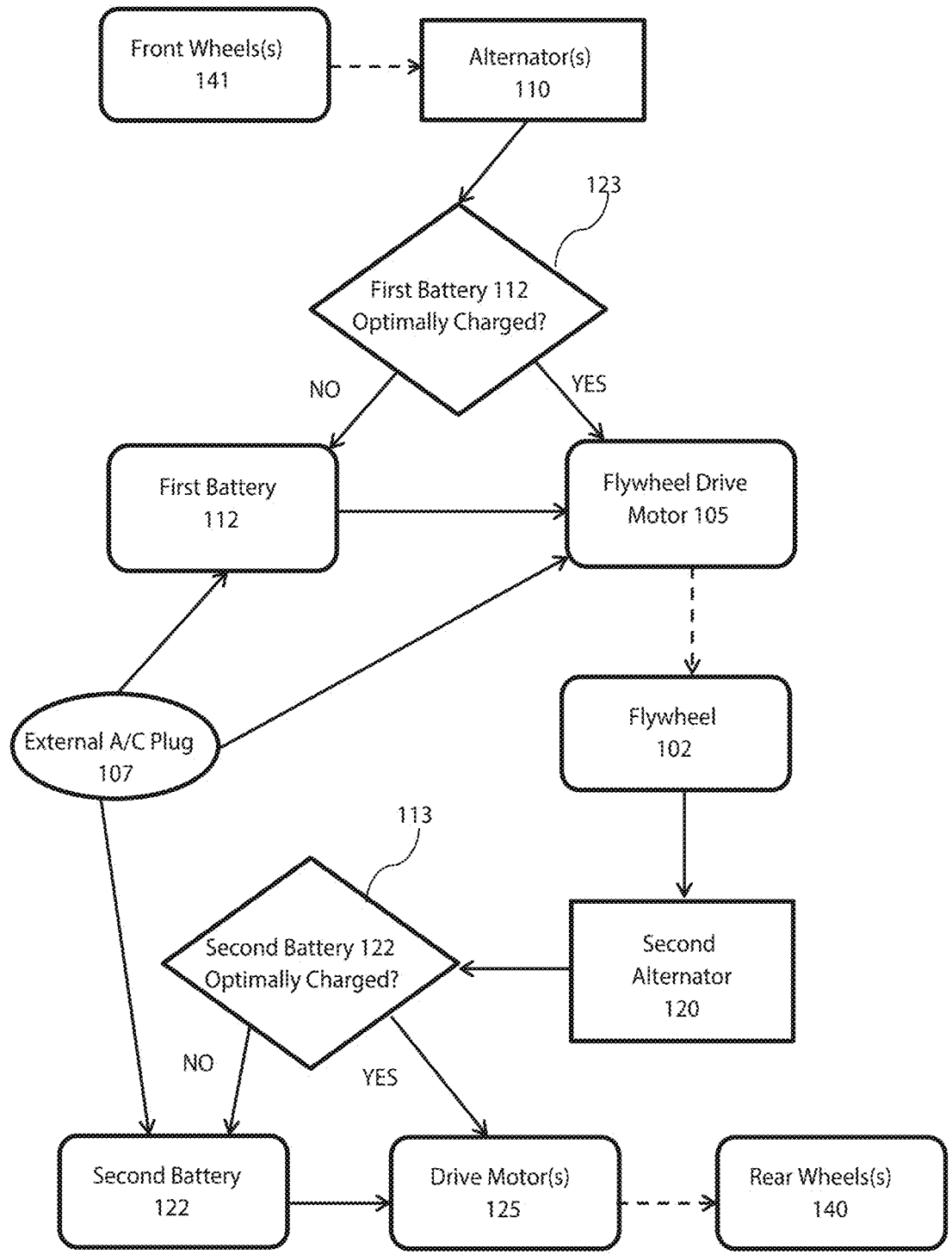
FIG. 8 is a simplified block diagram showing routing of electricity within a vehicle drive system.

FIG. 8 is a schematic showing the flow of current (depicted by solid arrows) through embodiments of drive system 600. Additionally, FIG. 8 shows mechanical couplings (depicted by dashed arrows). In this and some other embodiments of the invention, current flow is regulated by ECM 131. As previously described, a shaft of alternator(s) 110 is mechanically turned by rotation of front wheels 141 of the vehicle. Rotation of the alternator shaft of alternator 110 causes alternator 110 to generate electrical current. Current generated by alternator(s) 110 charges first battery 112, or, depending on the charge status of first battery 112, directly energizes flywheel drive motor 105. Flywheel drive motor 105 converts electrical current from first battery 112 or alternator 110 into mechanical rotation of flywheel 102. In other words, current from alternator(s) 110 preferentially charges first battery 112 with surplus current energizing flywheel drive motor 105. In this way, kinetic energy of a moving vehicle is initially stored as charge in first battery 112, then as kinetic energy in flywheel 102. Rotation of flywheel 102 turns the shaft of second alternator 120, which generates a second current. This second current, in turn, preferentially charges second battery 122, with surplus current directly energizing drive motor(s) 125, powering rear wheels 140 and propelling the vehicle. Drive motor(s) 125 are energized by either second battery 122 or second alternator 120 depending on the balance between the charge state of second battery 122 and the rotational speed of flywheel 102.

In this embodiments, a first intelligent charger 113 contained within ECM 131 is electrically interposed between second alternator 120, second battery 122, and drive motor(s) 125. First intelligent charger 113 monitors second battery 122's voltage, temperature, and/or time under charge to continuously determine the optimum charging current. Charging is terminated and ECM 131 directs all current from second alternator 120 to drive motor(s) 125 when second battery 122 is optimally charged. A throttle mechanism, not part of drive system 700 but inherent to a vehicle in which drive system 700 is installed, provides an input prompting ECM 131 to regulate a current through drive motor(s) 125 necessary to maintain the vehicle at a desired speed. Similarly, second intelligent charger 123 contained within ECM 131 is electrically interposed between first alternator(s) 110, first battery 112, and flywheel drive motor 105. Second intelligent charger 123 monitors first battery 112's voltage, temperature, and/or time under charge to continuously determine the optimum charging current. Charging is terminated and all current from first alternator(s) 110 is directed to flywheel drive motor 105 when first battery 112 is optimally charged.

Figure 9A:
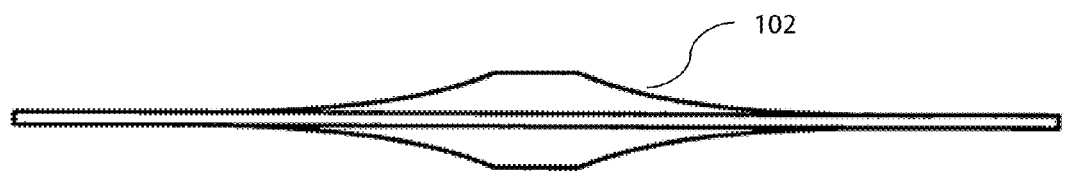
FIG. 9(a) is a side view of one embodiment of flywheel 102.
Figure 9B:
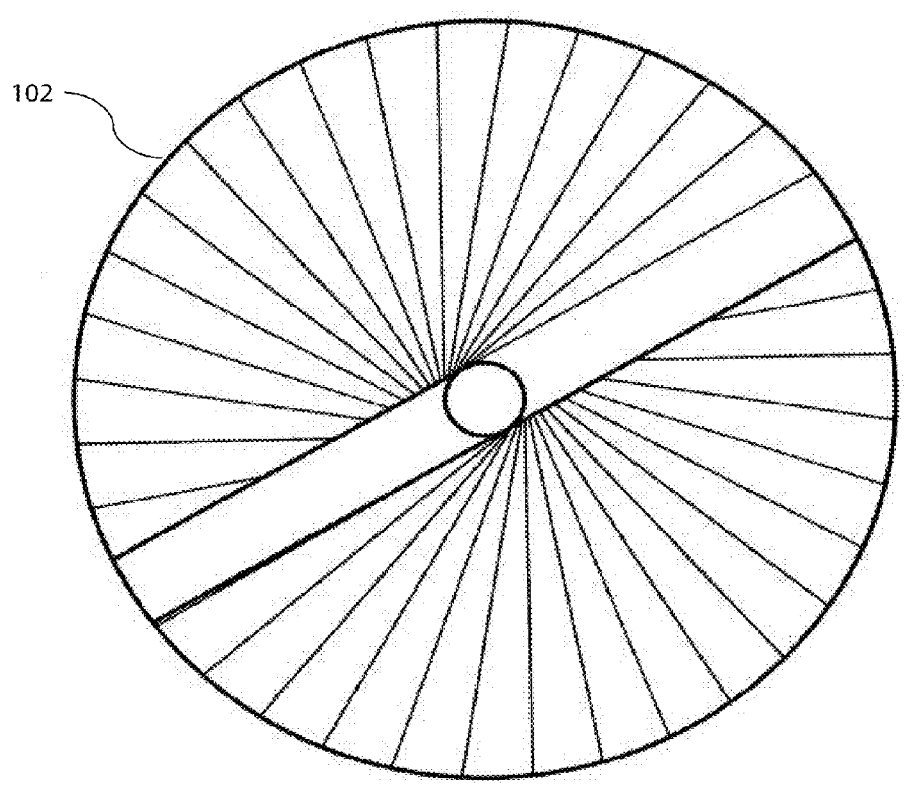
FIG. 9(b) is a top view of one embodiment of flywheel 102.

FIG. 9a and FIG. 9b show a side view and top view respectively of an embodiment of flywheel 102. Flywheel 102 can be used in any of vehicle drive systems 100, 200, 300, 400, 500, or 600. Flywheels for automotive and other applications are available in a variety of shapes and sizes, and manufactured from a variety of materials. In the embodiment shown, flywheel 102 is formed in the general shape of a cissoids or conchoids. This is not meant to be limiting. Flywheel 102 can take any number of shapes, including but not limited to other discoid shapes, cylinders, toroid, and others. Any shape found to most efficiently preserve rotational inertia and minimize drag from the surrounding fluid can be used, depending on the embodiment of the invention. Also, the material and method used to manufacture flywheel 102 may be any one or combination of materials or methods known to those in the art. In some embodiments, flywheel 102 is made of a plurality of high tensile strength straight filaments. In some other example embodiments, flywheel 102 is formed by a pour cast, built-up in layers using sequential overlapping strips of high tensile-strength material (as shown in the embodiment shown in FIG. 9b), or by circumferential windings of wire or other fiber. In the case of built-up or wound construction, the outer margin of flywheel 102 may be reinforced by a circumferential boundary layer of the same or a second material.

Before driving a vehicle equipped with an embodiment of drive system 100, 200, 300, 400, 500, or 600 from a state in which flywheel 102 is non-rotating, the user/driver may first elect to spin-up flywheel 102 by providing power to flywheel drive motor 105. This power may come from first battery 112 or, in some embodiments, is provided through external A/C plug 107 as described earlier and shown in FIG. 3 and FIG. 8. Rotation of flywheel 102 is not necessary to initiate use of the motor vehicle, however, where second battery 122 is adequately charged to provide power to drive motors 125. The primary power source of the all-electric or gasoline-electric hybrid vehicle can serve as the initial sole source of power for vehicle operation. As the vehicle is driven, however, drive system 100 progressively augments the primary power source driving rear wheels 140 through conversion and storage of the moving vehicle's kinetic energy progressively within first battery 112, rotating flywheel 102, and second battery 122. After the vehicle is parked, rotating flywheel 102 continues to rotate for a considerable time before stored kinetic energy is completely dissipated by friction. Accordingly, and if necessary to fully charge second battery 122 and then first battery 112, ECM engages clutch 124 and flywheel 102 continues driving second alternator 120 even after use of the vehicle is completed. This recaptured backup power is immediately available to power drive motors 125 when vehicle use is resumed. Therefore, later driving of a previously parked vehicle is possible without utilization of the vehicle's primary power source.

Figure 10:
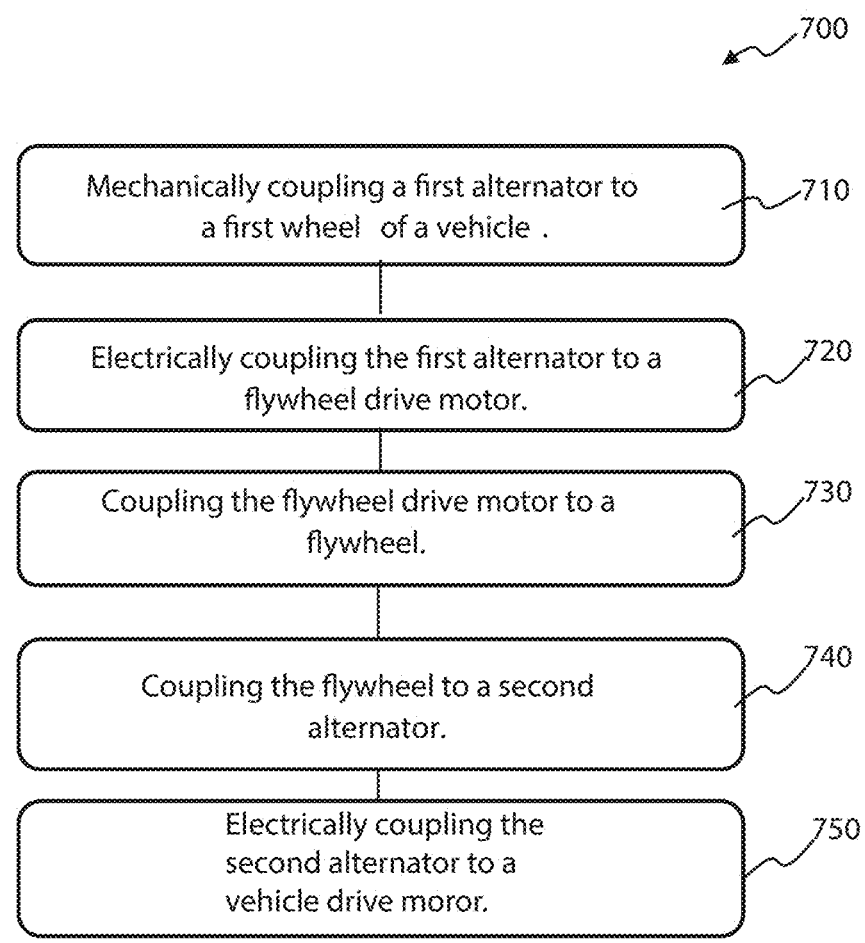
FIG. 10 is a flowchart showing a method 700 of forming a vehicle drive system.

FIG. 10 shows a method 700 of forming a drive system for a vehicle. Step 710 of method 700 is mechanically coupling a first alternator to a first wheel of a vehicle wherein rotation of the first wheel of the vehicle causes the first alternator to generate electricity. In some embodiments, the electricity generated by the first alternator is stored in a first battery. In some embodiments, the electricity generated by the first alternator is stored in the primary batteries of the vehicle. In some embodiments, the electricity generated by the first alternator powers the vehicle's primary electric drive motor(s).

Step 720 of method 700 is electrically coupling the first alternator to a flywheel drive motor wherein the first alternator powers the flywheel drive motor. In some embodiments, first alternator powers the flywheel drive motor directly. In some embodiments, first alternator powers the flywheel drive motor through a battery or other similar means of energy storage.

Step 730 of method 700 is coupling the flywheel drive motor to a flywheel, wherein powering of the flywheel drive motor causes the flywheel to rotate. In some embodiments, the coupling is a direct mechanical coupling. In some embodiments, the coupling is an indirect mechanical coupling using a gear, a pulley or belt, or another mechanical means.

Step 740 of method 700 is coupling the flywheel to a second alternator, wherein rotation of the flywheel causes the second alternator to generate electricity.

Step 750 of method 700 is electrically coupling the second alternator to a vehicle drive motor, wherein electricity generated by the second alternator powers the vehicle drive motor.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A method of forming a drive system for a vehicle, comprising the steps of:
   mechanically coupling a first generator to a first non-drive wheel, not coupled to a motor, of the vehicle, wherein rotation of the first non-drive wheel of the vehicle causes the first generator to generate electricity;
   electrically coupling the first generator to a flywheel drive motor, wherein the first generator powers the flywheel drive motor;
   coupling the flywheel drive motor to a flywheel, wherein rotation of the flywheel drive motor causes the flywheel to rotate;
   coupling the flywheel to a second generator, wherein rotation of the flywheel causes the second generator to generate electricity;
   electrically coupling the second generator to a vehicle drive motor, wherein electricity generated by the second generator powers the vehicle drive motor; and
   electrically coupling a second battery to the vehicle drive motor and electrically coupled to the second generator.

* * * * *